United States Patent
Kim et al.

(10) Patent No.: US 9,672,599 B2
(45) Date of Patent: Jun. 6, 2017

(54) IMAGE PROCESSING DEVICES FOR SUPPRESSING COLOR FRINGE, AND IMAGE SENSOR MODULES AND ELECTRONIC DEVICES INCLUDING THE SAME

(71) Applicant: Samsung Electronics Co., Ltd., Suwon-si, Gyeonggi-do (KR)

(72) Inventors: Jihye Kim, Seongnam-si (KR); Haejin Ju, Seongnam-si (KR); Chang-Dae Jung, Seoul (KR); Dong-Won Jang, Seoul (KR); Hyo-Song Kim, Chuncheon-si (KR); Rae-Hong Park, Seoul (KR)

(73) Assignees: SAMSUNG ELECTRONICS CO., LTD., Gyeonggi-Do (KR); SOGANG UNIVERSITY RESEARCH FOUNDATION, Seoul (KR)

( * ) Notice: Subject to any disclaimer, the term of this patent is extended or adjusted under 35 U.S.C. 154(b) by 0 days.

(21) Appl. No.: 14/741,661

(22) Filed: Jun. 17, 2015

(65) Prior Publication Data
US 2016/0180505 A1    Jun. 23, 2016

(30) Foreign Application Priority Data
Dec. 18, 2014 (KR) ......................... 10-2014-0183574

(51) Int. Cl.
*G06K 9/00* (2006.01)
*G06T 5/00* (2006.01)
(Continued)

(52) U.S. Cl.
CPC ................ *G06T 5/003* (2013.01); *G06T 5/20* (2013.01); *H04N 1/60* (2013.01); *H04N 9/045* (2013.01);
(Continued)

(58) Field of Classification Search
CPC . G06T 5/003; G06T 5/20; H04N 1/60; H04N 1/193; H04N 1/047; H04N 1/107; H04N 9/045; H04N 2201/04703
See application file for complete search history.

(56) References Cited

U.S. PATENT DOCUMENTS 5,270,808 A * 12/1993 Tanioka ................. H04N 1/644
358/500
5,319,472 A * 6/1994 Hill ........................ H04N 1/401
358/500

(Continued)

FOREIGN PATENT DOCUMENTS

JP    2003-060983 A    2/2003
JP    2006-121138 A    5/2006

OTHER PUBLICATIONS

C. Jung, Color Fringe Correction Using Guided image Filtering published in ISCE 2014 on Jun. 22-25, 2014 in Juju Island in Korea, 2 pages.

(Continued)

*Primary Examiner* — Amir Alavi
(74) *Attorney, Agent, or Firm* — Harness, Dickey & Pierce PLC

(57) ABSTRACT

An image processing device includes a guided image filtering circuit and an image summation circuit. The guided image filtering circuit is configured to receive an input image including a green channel, a red channel and a blue channel, and to generate a corrected red channel and a corrected blue channel by applying a guided filter with respect to the red channel and the blue channel based on the green channel. The image summation circuit is configured to generate an output image by summing the green channel, the corrected red channel, and the corrected blue channel.

13 Claims, 15 Drawing Sheets

(51) Int. Cl.
G06T 5/20 (2006.01)
H04N 9/04 (2006.01)
H04N 1/60 (2006.01)
H04N 1/58 (2006.01)

(52) U.S. Cl.
CPC ...... G06T 2207/10024 (2013.01); H04N 1/58 (2013.01)

(56) References Cited

U.S. PATENT DOCUMENTS

| | | | | |
|---|---|---|---|---|
| 5,434,683 | A * | 7/1995 | Sekine | H04N 1/62 358/518 |
| 5,477,345 | A * | 12/1995 | Tse | H04N 1/486 348/272 |
| 6,256,062 | B1 * | 7/2001 | Endo | H04N 17/002 348/188 |
| 6,970,597 | B1 * | 11/2005 | Olding | G06T 3/4015 348/273 |
| 7,053,935 | B2 * | 5/2006 | Guimaraes | H04N 9/11 348/222.1 |
| 7,577,292 | B2 | 8/2009 | Kang | |
| 7,719,606 | B2 * | 5/2010 | Wallace | H04N 9/735 348/360 |
| 8,379,977 | B2 | 2/2013 | Chuang et al. | |
| 8,587,705 | B2 * | 11/2013 | Stanhill | G06T 1/20 348/222.1 |
| 8,600,188 | B2 | 12/2013 | Segall | |
| 8,638,342 | B2 | 1/2014 | Cote et al. | |
| 2011/0158515 | A1 | 6/2011 | Chuang et al. | |
| 2013/0050546 | A1 * | 2/2013 | Kano | H04N 5/3572 348/280 |
| 2014/0193069 | A1 | 7/2014 | Kim et al. | |
| 2016/0180505 | A1 * | 6/2016 | Kim | G06T 5/003 382/167 |

OTHER PUBLICATIONS

H. Ju, "Colour fringe detection and correction in YCbCr colour space" IET Image Process., 2013, vol. 7, Iss. 4, 10 pages.
S. Chung, "Removing chromatic aberration by digital image processing" Optical Engineering, vol. 49(6), 10 pages, Jun. 2010.
K. He, "Guided Image Filtering" in IEEE Trans. Pattern Analysis and Machine Intelligence, vol. 35, 2013, 12 pages.
J. Chang, "Correction of axial and lateral chromatic aberration with false color filtering" IEEE Image Processing, vol. 22, No. 3, 13 pages, Mar. 2013.
V. Kaufmann, "Elimination of color fringes in digital photographs caused by later chromatic aberration" in Proc. 20th Int. Comm. Int. Phtogramn. Archit. Symp. Conf., Oct. 2005, 6 pages.
T. Boult, "Correcting chromatic aberrations using image warping" in Proc. IEEE Conf. Comput. Vis. Pattern Recognit., 15 pages, Jun. 1992.
G. Petschnigg, "Digital photography with flash and no-flash image pairs" ACM Trans. Graphics, vol. 23, No. 3, 9 pages, 2004.
D. Jang, "Color Fringe Correction Based On Image Fusion" published in ICIP 2014 on Oct. 27-30, 2014 in Paris in France, 5 pages.
I. Yerushalmy, "Digital image forgery detection based on lens and sensor aberration" Int. J. of Computer Vision, vol. 92, No. 1, 21 pages, Mar. 2011.
P. Mouroulis, "Geometrical Optics and Optical Design" London, U.K.: Oxford Univ. Press, 1997, 7 pages.
S. Li, "Image Fusion with Guided Filtering" IEEE Transactions on Image Processing, vol. 22, No. 7, Jul. 2013, 12 pages.
S. Pei, "Effective Color Interpolation in CCD Color Filter Arrays Using Signal Correlation" IEEE Trans. Circuits and System for Video Technology, vol. 13, No. 6, 11 pages, Jun. 2003.
J. Adams, "Color Processing in Digital Cameras" IEEE Micro, vol. 20, No. 6, 11 pages, Nov./Dec. 1998.
N. Koren, "The Imatest program: comparing cameras with different amounts of sharpening" in Proc. SPIE International Symposium on Electronic Imaging, vol. 6069, 9 pages, San Jose, CA, Jan. 2006.
I. Sprow, Sprow and P. zolliker's HDR Database, EMPA Media Technology Available: <http://empamedia.ethz.ch/hdrdatabase/>, 5 pages, 2014.
Office Action dated May 20, 2016 issued in U.S. Appl. No. 14/741,599.
US Notice of Allowance dated Aug. 26, 2016 in U.S. Appl. No. 14/741,599.

* cited by examiner

20

21

22

40

41

42

IMAGE PROCESSING DEVICES FOR SUPPRESSING COLOR FRINGE, AND IMAGE SENSOR MODULES AND ELECTRONIC DEVICES INCLUDING THE SAME

CROSS-REFERENCE TO RELATED APPLICATION(S)

This application claims priority under 35 U.S.C. §119 to Korean Patent Application No. 10-2014-0183574 filed on Dec. 18, 2014, the entire contents of which are incorporated herein by reference.

BACKGROUND

Field

One or more example embodiments of inventive concepts relate to image processing devices, for example, image processing devices capable of suppressing and/or removing color fringe, and image sensor modules and electronic devices having the same.

Description of Related Art

When a digital camera captures a real scene, a lens may not focus all colors to a convergence point. Accordingly, color distortion may occur around the boundary of objects of a digital color image. The color distortion may appear differently according to exposure of the digital camera. Moreover, as resolution of digital color images increases, or when digital cameras are used for more detailed shooting, color distortion may become worse.

SUMMARY

One or more example embodiments of inventive concepts provide image processing devices capable of suppressing and/or removing color fringe.

One or more example embodiments of inventive concepts provide image sensor modules including image processing devices capable of suppressing and/or removing color fringe.

One or more example embodiments of inventive concepts provide mobile devices in which an application processors including image processing devices are embedded. The image processing devices may be capable of suppressing and/or removing color fringe.

In accordance with at least one example embodiment of inventive concepts, an image processing device may include a guided image filtering circuit configured to receive an input image including a green channel, a red channel and a blue channel, and to generate a corrected red channel and a corrected blue channel by applying a guided filter with respect to the red channel and the blue channel based on the green channel, and an image summation circuit configured to generate an output image by summing the green channel, the corrected red channel and the corrected blue channel.

In at least one example embodiment, the guided image filtering circuit may use the green channel as a guidance image. The guided image filtering circuit may apply the guided filter with respect to all pixels in the input image. The guided image filtering circuit may use each of the red channel and the blue channel as filtering input. The image processing device may not perform color fringe detection process with respect to the input image. The guided image filtering circuit may filter the red channel and the blue channel based on the green channel in an edge area of the input image.

The guided image filtering circuit may maintain the red channel, the green channel, and the blue channel unchanged in a non-edge area of the input image.

In accordance with at least one other example embodiment of inventive concepts, an image sensor module may include an image sensor and an image processing device. The image processing device may be configured to receive an input image including a green channel, a red channel, and a blue channel from the image sensor. The image processing device may include a guided image filtering circuit configured to generate a corrected red channel and a corrected blue channel by applying a guided filter with respect to the red channel and the blue channel based on the green channel, and an image summation circuit configured to generate an output image by summing the green channel, the corrected red channel, and the corrected blue channel.

In at least some example embodiments, the guided image filtering circuit may use the green channel as a guidance image. The guided image filtering circuit may apply the guided filter with respect to all pixels in the input image. The guided image filtering circuit may use each of the red channel and the blue channel as filtering input. The image processing device may not perform color fringe detection process with respect to the input image. The guided image filtering circuit may filter the red channel and the blue channel based on the green channel in an edge area of the input image. The guided image filtering circuit may maintain the red channel, the green channel, and the blue channel unchanged in a non-edge area of the input image.

The input image may include color fringe and the output image may not include the color fringe.

At least one other example embodiment provides an image sensor module comprising an image processing device. The image processing device is configured to correct chromatic aberration in an input image by applying a guided image filter to a red channel and a blue channel of the input image. The input image includes a green channel, the red channel, and the blue channel, and the guided image filter is based on the green channel. The image processing device is further configured to output the chromatic aberration corrected image.

The image processing device may be further configured to generate the chromatic aberration corrected image by summing the filtered red channel, the filtered blue channel, and the green channel.

The image processing device may be further configured to generate the chromatic aberration corrected image without performing a chromatic aberration detection process with respect to the input image.

The image processing device may be further configured to apply the guided image filter with respect to all pixels in the input image.

The image processing device may be further configured to: apply the guided image filter to the red channel and the blue channel in an edge area of the input image; and maintain the red channel, the green channel, and the blue channel unchanged in a non-edge area of the input image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Inventive concepts will become more apparent from the description of example embodiments of inventive concepts, as illustrated in the accompanying drawings in which like reference characters refer to the same parts throughout the different views. The drawings are not necessarily to scale, emphasis instead being placed upon illustrating the principles of the inventive concepts. In the drawings.

DETAILED DESCRIPTION

Figure 1A:
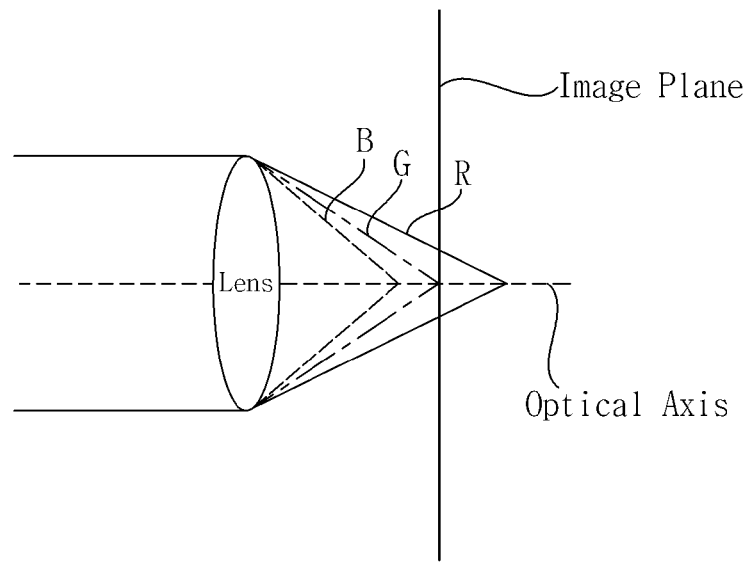
FIGS. 1A and 1B are conceptual diagrams for describing example types of chromatic aberration.

Specific structural and functional details disclosed herein are merely representative for purposes of describing example embodiments of inventive concepts, however, example embodiments may be embodied in many alternate forms and should not be construed as limited to example embodiments set forth herein.

While inventive concepts are susceptible to various modifications and alternative forms, specific embodiments thereof are shown by way of example in the drawings and will herein be described in detail. It should be understood, however, that there is no intent to limit inventive concepts to the particular forms disclosed, but on the contrary, inventive concepts are to cover all modifications, equivalents, and alternatives falling within the spirit and scope of inventive concepts. It will be understood that, although the terms first, second, A, B, etc. may be used herein in reference to elements of inventive concepts, such elements should not be construed as limited by these terms. For example, a first element could be termed a second element, and a second element could be termed a first element, without departing from the scope of inventive concepts. Herein, the term "and/or" includes any and all combinations of one or more referents.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe embodiments of inventive concepts is not intended to limit the scope of inventive concepts. The articles "a," "an," and "the" are singular in that they have a single referent, however, the use of the singular form in the present document should not preclude the presence of more than one referent. In other words, elements of inventive concepts referred to in singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which inventive concepts belong. It will be further understood that terms in common usage should also be interpreted as is customary in the relevant art and not in an idealized or overly formal sense unless expressly so defined herein.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, example embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing image sensors, image sensing modules, digital cameras, electronic devices, such as smartphones, personal digital assistants, laptop or tablet computers, display devices, etc. Such existing hardware may include one or more Central Processing Units (CPUs), graphics processing units (GPUs), image processors, system-on-chip (SOC) devices, digital signal processors (DSPs), application-specific-integrated-circuits, field programmable gate arrays (FPGAs) computers, or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Example embodiments of inventive concepts will be described below in more detail with reference to the attached drawings.

Figure 1B:
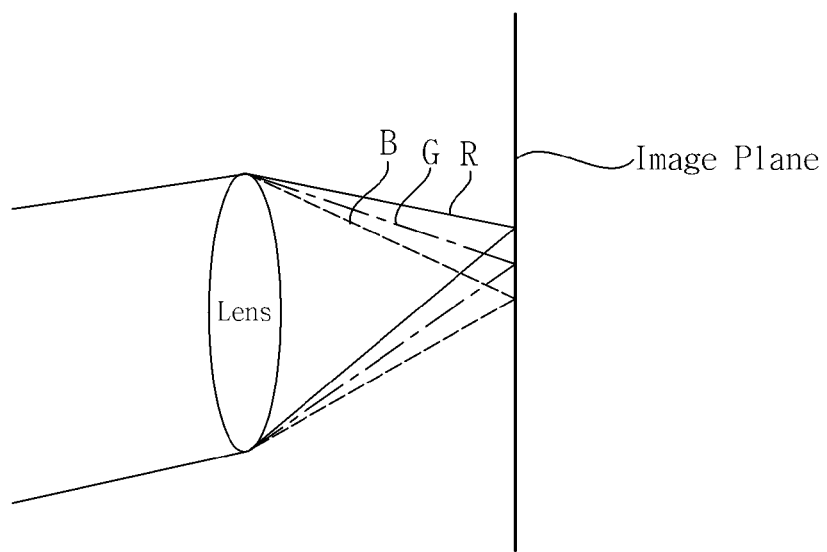

FIGS. 1A and 1B are conceptual diagrams for describing example types of chromatic aberration. More specifically, FIG. 1A shows an example of axial chromatic aberration (ACA), and FIG. 1B shows an example of lateral chromatic aberration (LCA). Chromatic aberration is also referred to as color fringe.

Referring to FIG. 1A, an image is projected on an image plane through a lens based on an optical axis. The image may include a red R channel, a green G channel, and a blue B channel.

Here, an image of the G channel forming the image coincides with a focal point, an image of the B channel is focused in front of the focal point, and an image of the R channel is focused behind the focal point. As a result, the image may be blurred.

Referring to FIG. 1B, an image passes through a lens at an oblique angle, and the image is projected on an image plane. Here, an image of the R channel, an image of the G channel, and an image of the B channel are each focused at different places on the image plane. Accordingly, the image may include geometric errors.

Figure 2A:
FIG. 2A is an image for describing example color fringe.

FIG. 2A is an image for describing example color fringe.

In FIG. 2A, the area 21 of the image 20 shown in FIG. 2A includes color fringe.

Color fringe may include a green-cyan fringe, a purple fringe, and a green-red fringe.

Figure 2B:
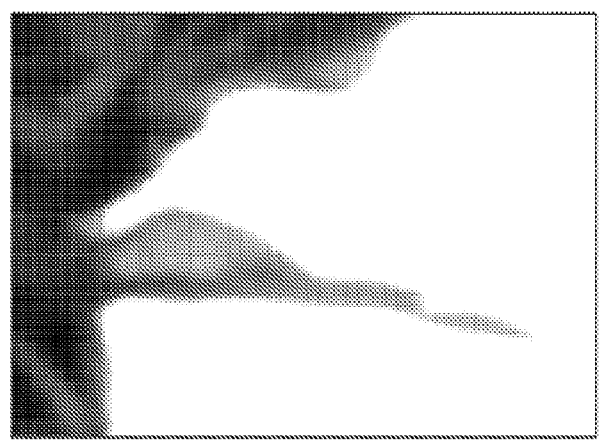
FIG. 2B is an enlarged image of a part of the image shown in FIG. 2A.

FIG. 2B is an enlarged image of a part of the image shown in FIG. 2A.

Referring to FIG. 2B, the image 22 shown in FIG. 2B is an enlarged image part of the area 21 of the image 20 shown in FIG. 2A. In this example, the image 22 includes a green-cyan fringe. An edge of the image where color fringe occurs may include image blurring.

Figure 3A:
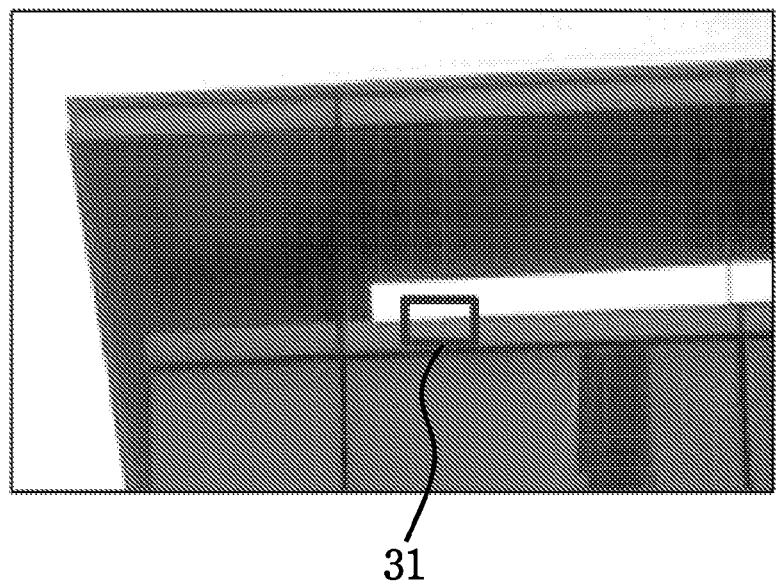
FIG. 3A is an image including color fringe areas.

FIG. 3A is another example image including color fringe areas.

Figure 3B:
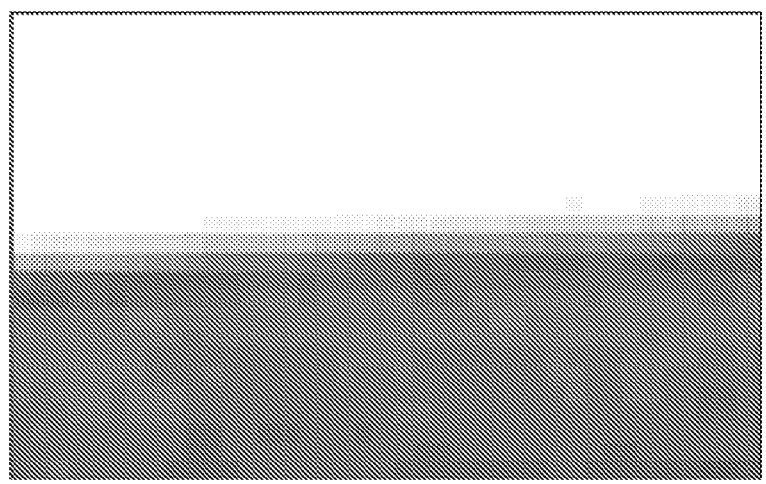
FIG. 3B is an enlarged image of a part of the image shown in FIG. 3A.

FIG. 3B is an enlarged image of a part of the example image shown in FIG. 3A.

In FIG. 3A, the specific area 31 of the image 30 includes color fringe.

The image 32 shown in FIG. 3B is an enlarged image of the specific area 31 of the image 30 shown in FIG. 3A. The image 32 shown in FIG. 3B includes color fringe.

Figure 3C:
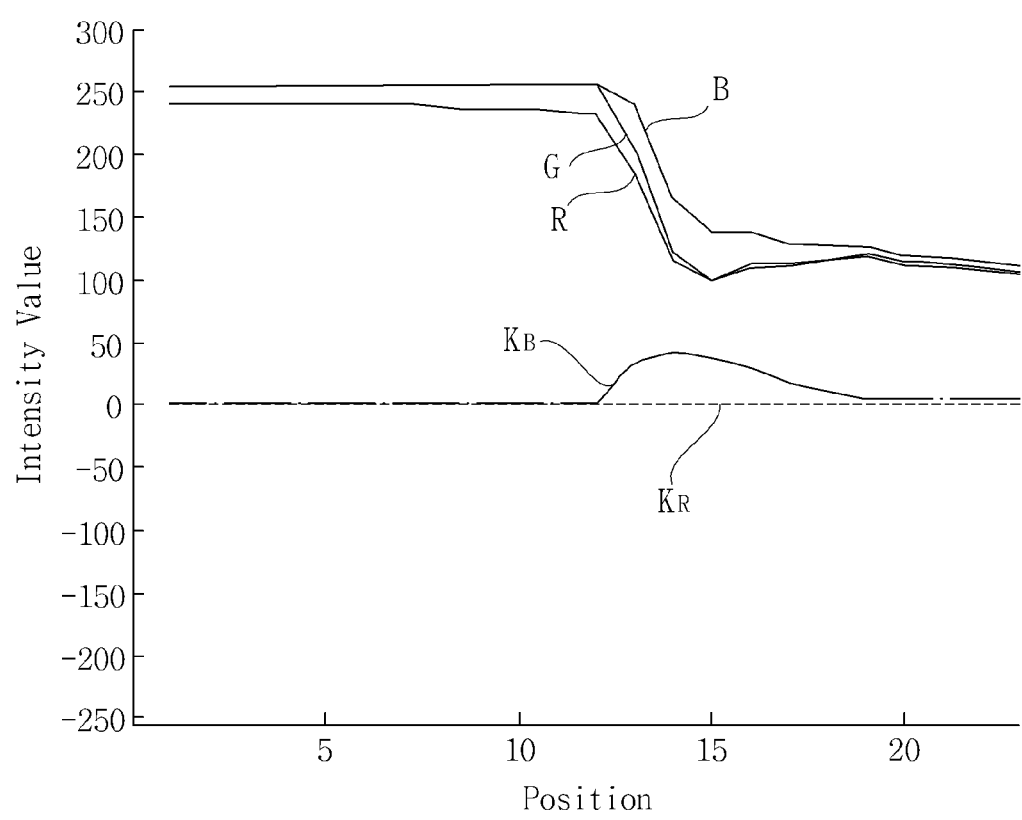
FIG. 3C is a graph illustrating an example pixel value with respect to each of the RGB channels of the image shown in FIG. 3B.

FIG. 3C is a graph illustrating example pixel values with respect to each of the RGB channels of the image shown in FIG. 3B.

Referring to FIGS. 3B and 3C, the abscissa is a coordinate of the color fringe area, and the ordinate is an intensity value (i.e., a pixel value).

Color difference values $K_B$ and $K_R$ are calculated according to Equation 1 shown below.

$$K_B = B - G,$$

$$K_R = R - G \qquad \text{[Equation 1]}$$

In Equation 1, $K_B$ is the color difference value between the blue channel B and the green channel G, and $K_R$ is the color difference value between the red channel R and the green channel G.

Color fringe may occur in an area where a pixel value R of the red channel, a pixel value G of the green channel, and a pixel value B of the blue channel change relatively sharply. In this example, $K_B$ changes substantially more than $K_R$ in the identified area.

Figure 4A:
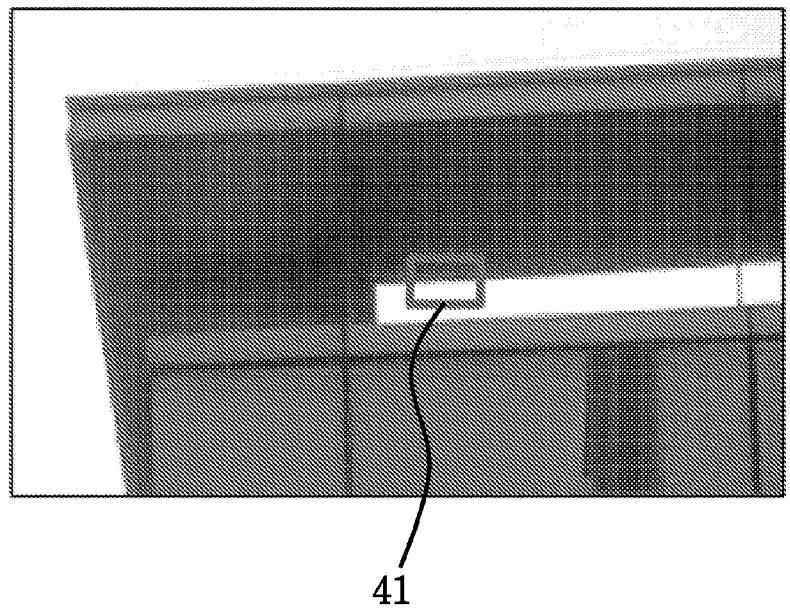
FIG. 4A is an image including example non-color fringe areas.

FIG. 4A is an image in which an example non-color fringe area is identified. In more detail, the specific area 41 of the image shown in FIG. 4A does not include color fringe.

Figure 4B:
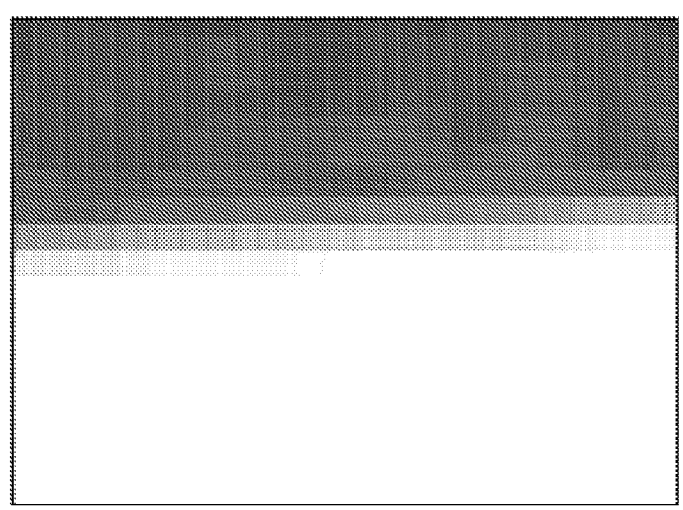
FIG. 4B is an enlarged image of a part of the image shown in FIG. 4A.

FIG. 4B is an enlarged image of a part of the image shown in FIG. 4A. The image 42 shown in FIG. 4B is an enlarged image of the specific area 41. The image 42 shown in FIG. 4B does not include color fringe.

Figure 4C:
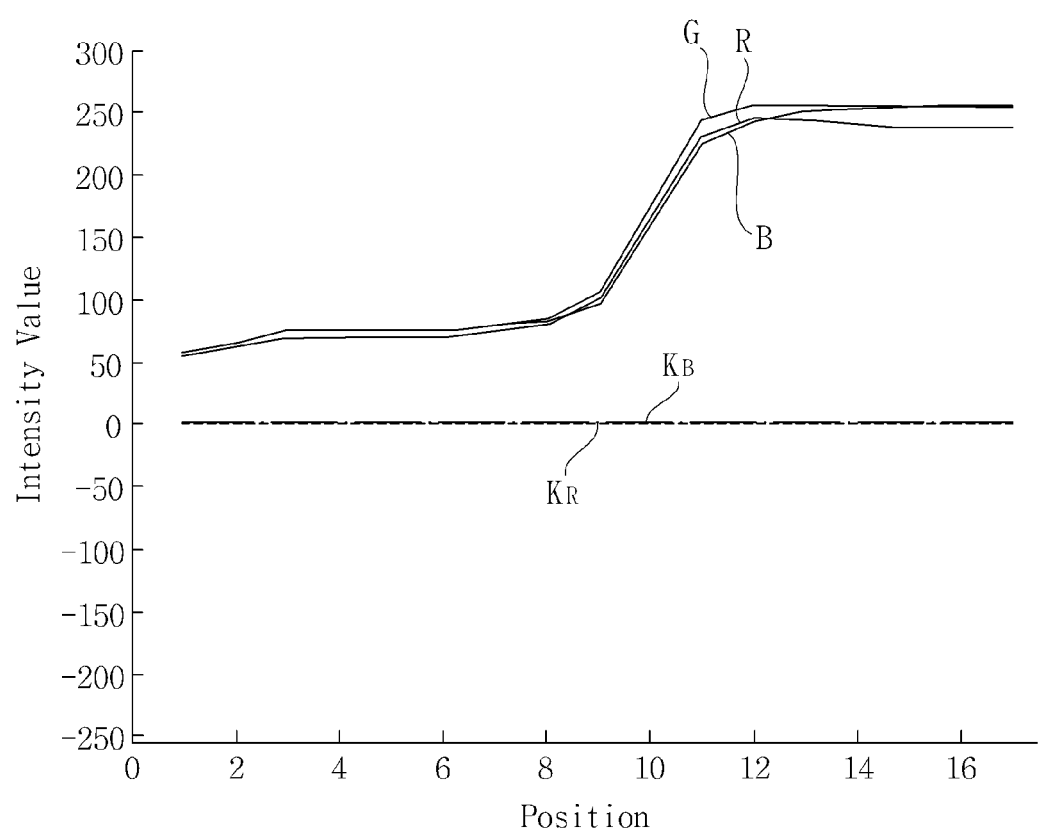
FIG. 4C is a graph illustrating an example pixel value with respect to each of the RGB channels of the image shown in FIG. 4B.

FIG. 4C is a graph illustrating example pixel values with respect to each of the RGB channels of the image shown in FIG. 4B.

Referring to FIGS. 4B and 4C, the abscissa is a coordinate of the color fringe area, and the ordinate is an intensity value (i.e., a pixel value).

In this example, color fringe may not occur in an area where a pixel value R of the red channel, a pixel value G of the green channel, and a pixel value B of the blue channel change relatively sharply. In this example, both $K_B$ and $K_R$ have relatively small values in the identified area.

Figure 5:
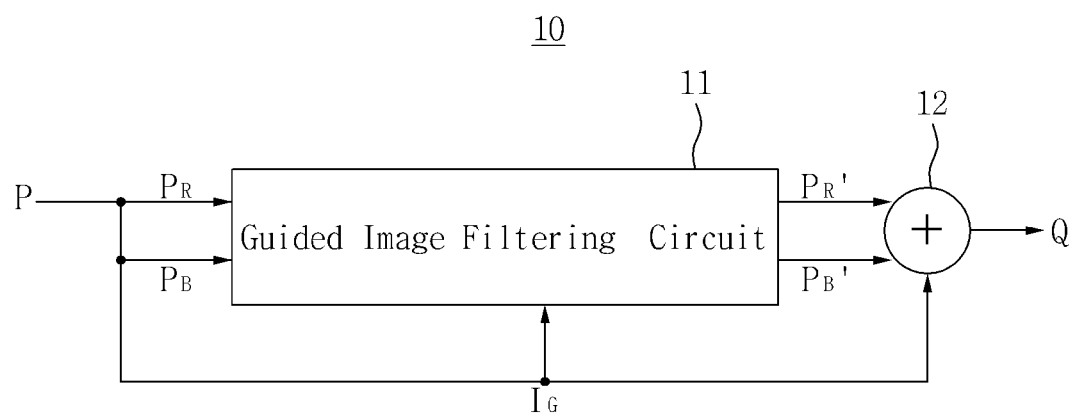
FIG. 5 is a block diagram illustrating an image processing device according to an example embodiment of inventive concepts.

FIG. 5 is a block diagram illustrating an image processing device, according to an example embodiment of inventive concepts.

Referring to FIG. 5, the image processing device 10, according to at least this example embodiment of inventive concepts, may include a guided image filtering circuit (or unit) 11 and an image summation circuit (or unit) 12. The guided image filtering circuit 11 receives an input image P. The input image P may include a red (R) channel $P_R$, a green (G) channel $P_G$, and a blue (B) channel $P_B$.

The G channel $P_G$ may be used as a guidance image $I_G$ of the guided image filtering circuit 11. The R channel $P_R$ and the B channel $P_B$ may be used as a filtering input of the guided image filtering circuit 11. In this regard, the R channel $P_R$ may be referred to as the R channel input image $P_R$, and the B channel $P_B$ may be referred to as the B channel input image $P_B$.

The guided image filtering circuit 11 may correct the R channel $P_R$ based on the guidance image $I_G$ to generate the corrected R channel $P_R'$. Moreover, the guided image filtering circuit 11 may correct the B channel $P_B$ based on the guidance image $I_G$ to generate the corrected B channel $P_B'$. The corrected R channel $P_R'$ may be referred to as the corrected R channel image $P_R'$, and the corrected B channel $P_B'$ may be referred to as the corrected B channel input image $P_B'$.

The guided image filtering circuit 11 outputs the corrected R channel $P_R'$ and the corrected B channel $P_B'$ to the image summation circuit 12. An operation of the guided image filtering circuit 11 will be described in more detail below and with regard to FIGS. 6A to 6C and 7A to 7D.

The image processing device 10 may apply guided image filtering with respect to all areas in the input image P in addition to the color fringe areas. Accordingly, the image processing device 10 may not perform a color fringe detection process prior to applying guided image filtering. In other words, a color fringe detection unit (or circuit) and process may be omitted.

Still referring to FIG. 5, for each of the R channel and the B channel, the guided image filtering circuit 11 may generate an output image $q_i$ according to Equation 2 shown below.

$$q_i = \bar{a}_i I_i + \bar{b}_i \qquad \text{[Equation 2]}$$

In Equation 2, subscript i denotes a pixel involved in the estimation square window $\omega_k$. $I_i$ is the guidance image $I_G$ for the denoted pixel i, and $\bar{a}_i$ and $\bar{b}_i$ are estimated average linear coefficients for the denoted pixel i. Moreover, $q_i$ is a final image for the corresponding channel (e.g., $P_R'$ or $P_B'$).

The estimated average linear coefficient $\bar{a}_i$ in Equation 2 may be given by Equation 3 shown below.

$$\bar{a}_i = \frac{1}{|\omega|} \sum_{k \in \omega_i} a_k \qquad \text{[Equation 3]}$$

In Equation 3, $a_k$ is a linear coefficient assumed to be constant in the square window $\omega_k$. The linear coefficient $a_k$ may be given by Equation 4 shown below.

$$a_k = \frac{\frac{1}{|\omega|} \sum_{i \in \omega_k} I_i p_i - \mu_k \bar{p}_k}{\sigma_k^2 + \varepsilon} \qquad \text{[Equation 4]}$$

In Equations 3 and 4, $\mu_k$ is an average of the G channel $I_G$, $\sigma_k^2$ is a variance of the G channel $I_G$, $|\omega|$ is the number of pixels in the window $\omega_k$, and $\bar{p}_k$ is an average of a respective one of the R channel $P_R$ and the B channel $P_B$. Also in Equation 4, $\varepsilon$ is a parameter according to a size of the window $\omega_k$.

Referring back to Equation 2, the estimated average linear coefficient $\bar{b}_i$ in may be given by Equation 5 shown below.

$$\bar{b}_i = \frac{1}{|\omega|} \sum_{k \in \omega_i} b_k \qquad \text{[Equation 5]}$$

In Equation 5, $b_k$ is another linear coefficient assumed to be constant in the square window $\omega_k$. The linear coefficient $b_k$ and may be given by Equation 6 shown below.

$$b_k = \bar{p}_k - a_k \mu_k \qquad \text{[Equation 6]}$$

Referring back to FIG. 5, the image summation circuit 12 may generate an output image Q by summing the corrected R channel $P_R'$, the corrected B channel $P_B'$ and the guidance image $I_G$.

In at least one example embodiment, the image processing device 10 maintains the R channel, the G channel, and the B channel unchanged in non-edge areas, while correcting the R channel and the B channel based on the G channel in edge areas.

Figure 6A:
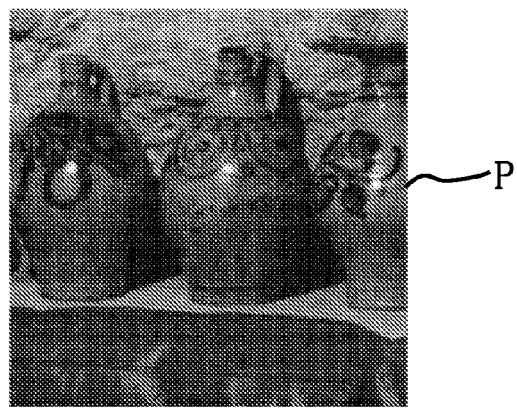
FIG. 6A shows an example of an input image P shown in FIG. 5.
Figure 6B:
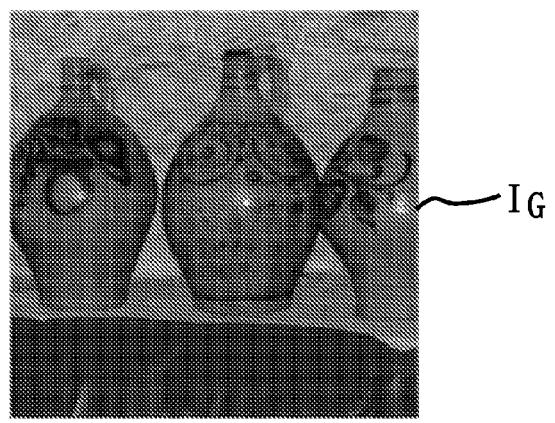
FIG. 6B shows an example of a guidance image $I_G$ shown in FIG. 5.
Figure 6C:
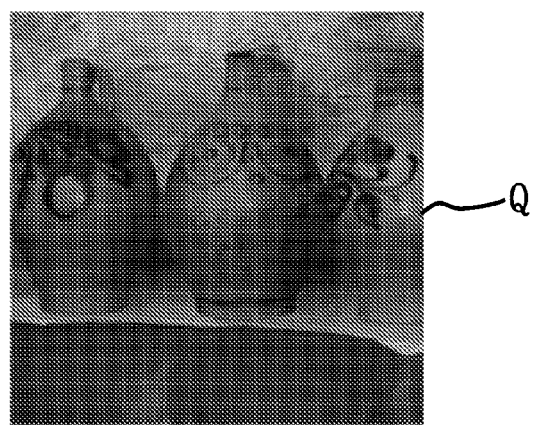
FIG. 6C shows an example output image Q shown in FIG. 5.

FIG. 6A shows an example of the input image P shown in FIG. 5, FIG. 6B shows an example of the guidance image $I_G$ shown in FIG. 5, and FIG. 6C shows an example of the output image Q shown in FIG. 5.

Referring to FIGS. 5, 6A, 6B and 6C, the input image P has a relatively large amount of noise and includes color fringe in at least some areas. The guided image filtering circuit 11 may receive the input image P.

The guidance image $I_G$ is an image without color fringe. In one example, the guidance image $I_G$ may be obtained using a flash device.

The guided image filtering circuit 11 may filter the R channel $P_R$ and the B channel $P_B$ in the input image P based on the guidance image $I_G$ to generate the corrected R channel $P_R'$ and the corrected B channel $P_B'$.

The image summation circuit 12 may generate the output image Q based on (e.g., by summing) the guidance image $I_G$, the corrected R channel $P_R'$, and the corrected B channel $P_B'$.

The output image Q is an image in which color fringe is suppressed and/or removed from the input image P based on the guidance image $I_G$.

FIGS. 7A to 7D are conceptual diagrams for describing example operation of the guided image filtering circuit 11 shown in FIG. 5.

Figure 7A:
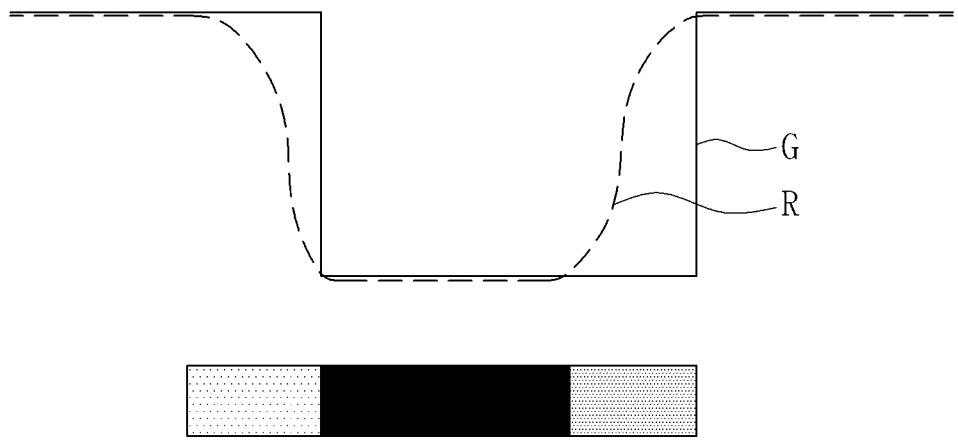
FIG. 7A is a conceptual diagram for describing example color distortion between a green channel and a red channel.

More specifically, FIG. 7A is a conceptual diagram for describing example color distortion between a green channel and a red channel.

Referring to FIG. 7A, a curve G of the green channel and a curve R of the red channel do not coincide. Accordingly, color fringe may occur in an image including the green channel and the red channel.

Figure 7B:
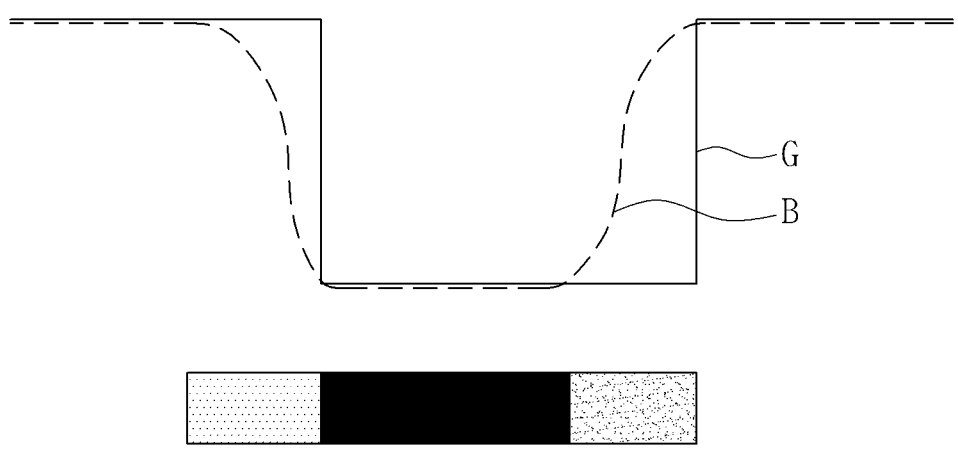
FIG. 7B is a conceptual diagram for describing example color distortion between a green channel and a blue channel.

FIG. 7B is a conceptual diagram for describing example color distortion between a green channel and a blue channel.

Referring to FIG. 7B, a curve G of the green channel and a curve B of the blue channel do not coincide. Accordingly, color fringe may occur in an image including the green channel and the blue channel.

Figure 7C:
FIG. 7C is a conceptual diagram for describing example correction of the color distortion shown in FIG. 7B.

FIG. 7C is a conceptual diagram for describing correction of the color distortion shown in FIG. 7B.

Referring to FIGS. 5 and 7C, the guided image filtering circuit 11 may correct a curve B of the blue channel similar to a curve G of the green channel. As shown in FIG. 7C, the guided image filtering circuit 11 may correct the curve B of the blue channel in the direction of the arrows.

Figure 7D:
FIG. 7D is a conceptual diagram for describing a result of the correction of the color distortion shown in FIG. 7B.

FIG. 7D is a conceptual diagram for describing an example result with respect to correction of a color distortion shown in FIG. 7B.

Referring to FIGS. 5 and 7D, a corrected curve B of the blue channel is corrected similar to a curve G of the green channel.

Figure 8:
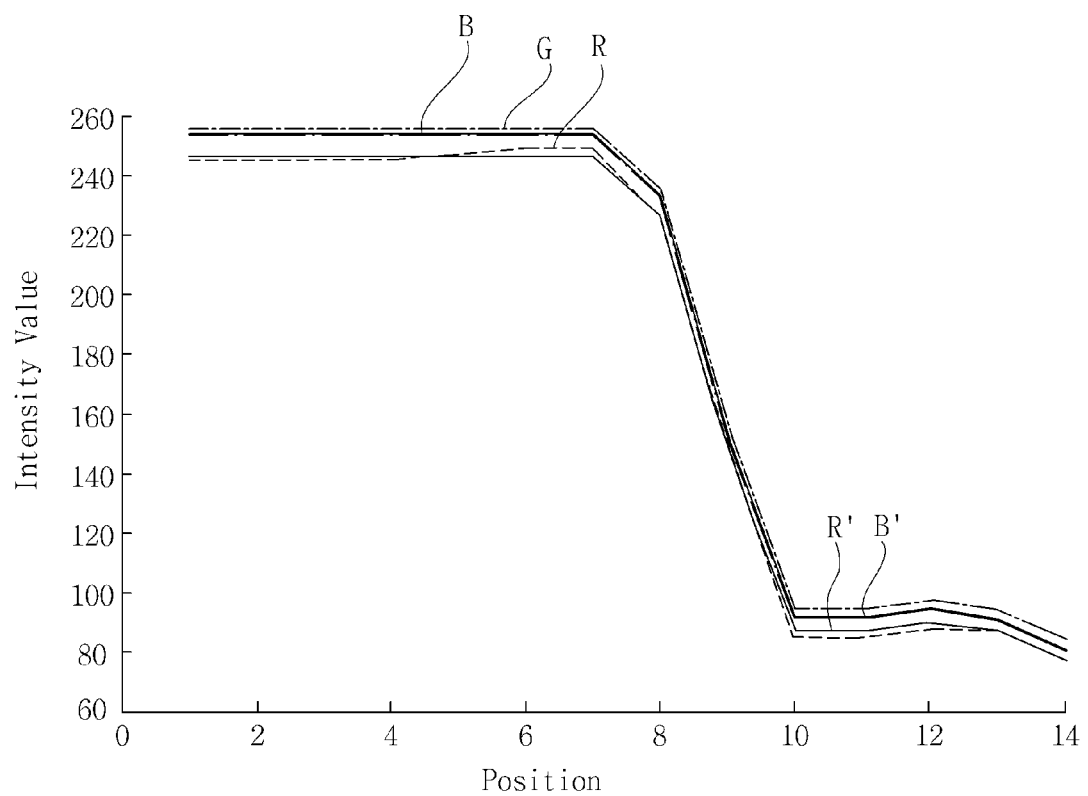
FIG. 8 is a graph illustrating a processed result of the example embodiment of the image processing device shown in FIG. 5, in an area in which there is no color fringe.

FIG. 8 is a graph illustrating an example processed result of the image processing device shown in FIG. 5 in an area without color fringe.

Referring to FIGS. 5 and 8, because correlation between each of the channels (e.g., R channel, G channel, and B channel) is relatively high, the unchanged input image is output as the output image.

Further, the R' channel, which is the corrected R channel, may not have a relatively large deviation from the R channel. Likewise, the B' channel, which is the corrected B channel, may not have a relatively large deviation from the B channel.

Figure 9:
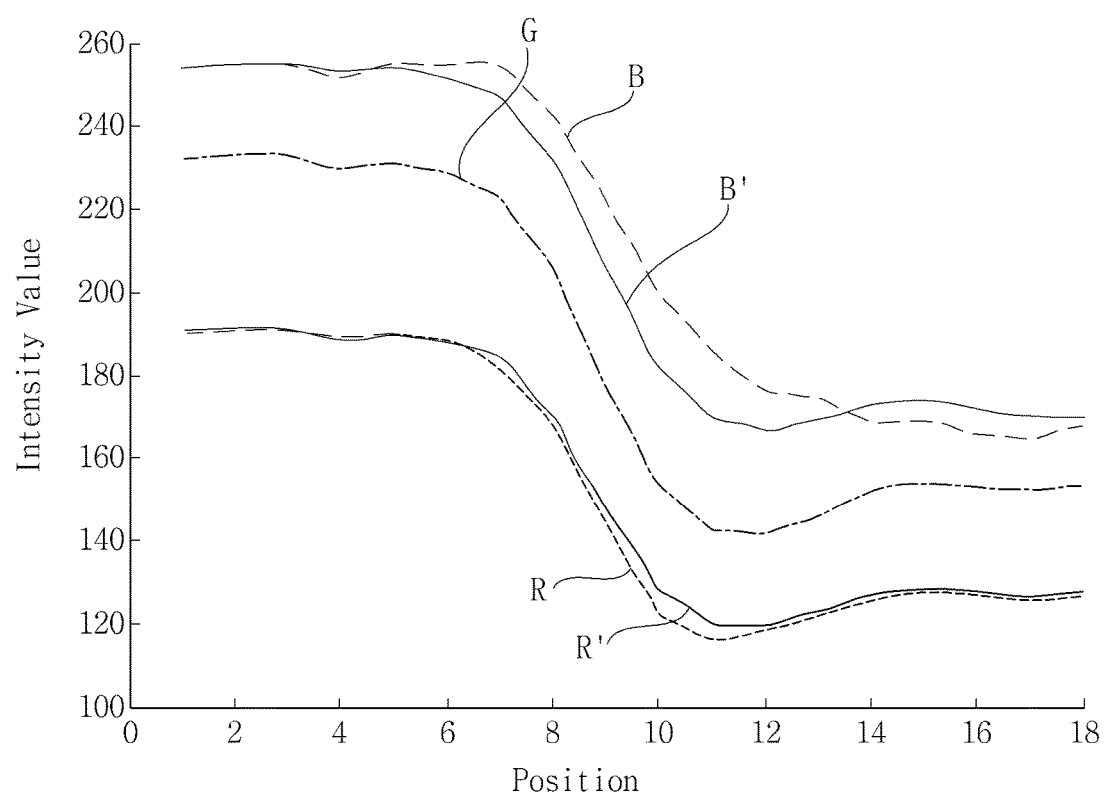
FIG. 9 is a graph illustrating a processed result of the image processing device shown in FIG. 5 in an area in which there is color fringe.

FIG. 9 is a graph illustrating a processed result of the image processing device shown in FIG. 5 in an area in which there is color fringe.

Referring to FIGS. 5 and 9, each channel (e.g., an R channel, a G channel, and a B channel) may have a relatively large deviation in an edge area.

To reduce the deviation, the image processing device 10 may transform the R channel into the R' channel (corrected R channel) based on the G channel. Likewise, the image processing device 10 may transform the B channel into the B' channel (corrected B' channel) based on the G channel.

Figure 10:
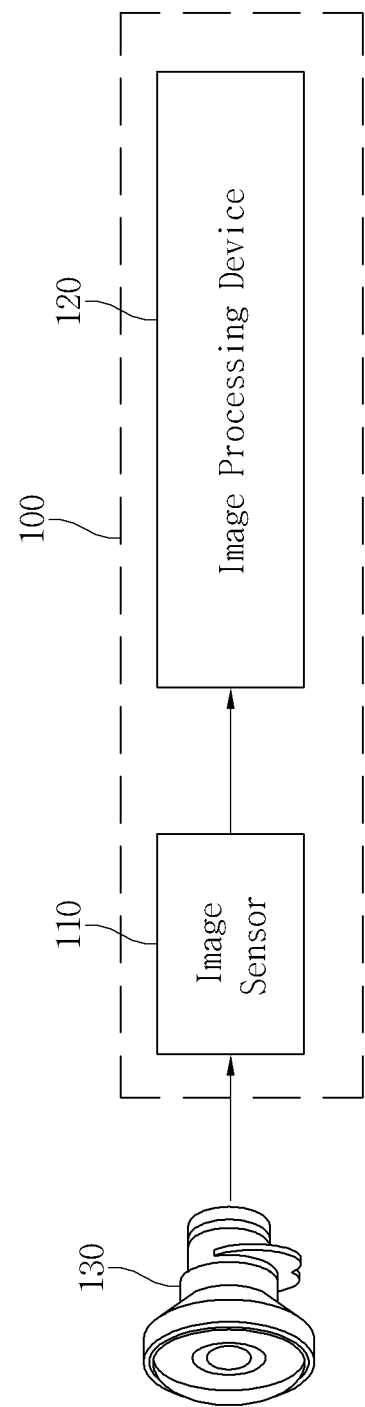
FIG. 10 is a block diagram illustrating an image sensor module including an image processing device, according to another example embodiment of inventive concepts.

FIG. 10 is a block diagram illustrating an image sensor module including an image processing device, according to another example embodiment of inventive concepts.

Referring to FIG. 10, the image sensor module 100 may include an image sensor 110 and an image processing device 120. In this example embodiment, the image sensor module 100 may be installed in a digital camera device, a smart-phone, a tablet PC, or the like.

The image sensor 110 may acquire image data of an object through a lens 130. The image sensor 110 transmits the image data to the image processing device 120.

In this example embodiment, the image sensor 110 may include a complementary metal-oxide semiconductor (CMOS) image sensor or charge coupled device (CCD) image sensor.

In this example embodiment, the image processing device 120 may include the image processing device 10 shown in FIG. 5.

Figure 11:
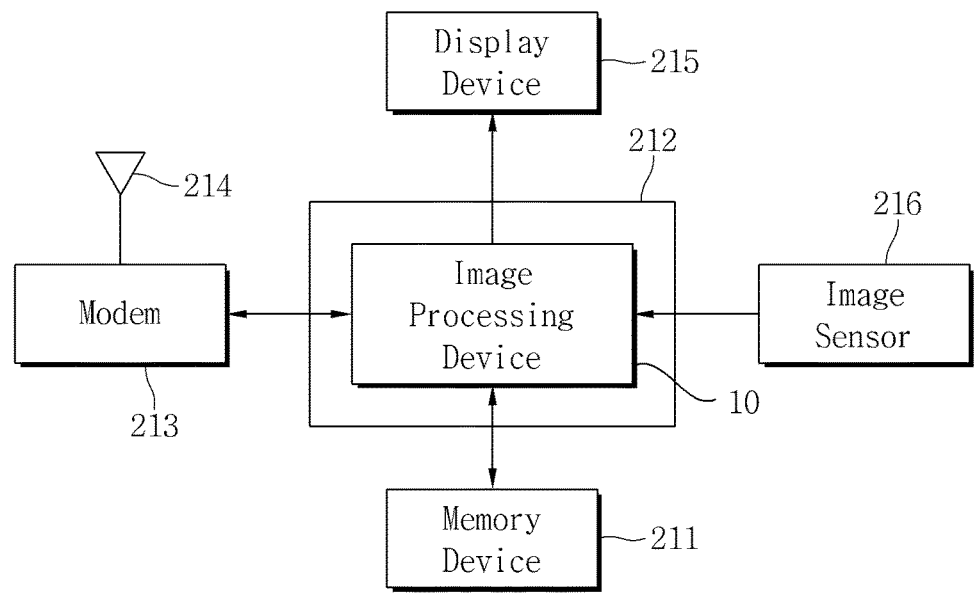
FIG. 11 is a block diagram of an example embodiment of a mobile device including the image processing device shown in FIG. 5.

FIG. 11 is a block diagram of an example embodiment of a mobile device including the image processing device shown in FIG. 5.

Referring to FIG. 11, the mobile device 210 may be embodied in a smart-phone, a tablet personal computer (PC), a ultra-mobile personal computer (UMPC), a personal digital assistant (PDA), a portable multimedia player (PMP), an MP3 player, an MP4 player, or any other portable electronic device.

The mobile device 210 may include a memory device 211, an application processor 212 including a memory controller for controlling the memory device 211, a modem 213, an antenna 214, and a display device 215.

The modem 213 may receive and transmit a radio signal through the antenna 214. For example, the modem 213 may convert the radio signal received through the antenna 214 into a signal to be processed in the application processor 212. In this example embodiment, the modem 213 may be a long term evolution (LTE) transceiver, a high speed downlink packet access/wideband code division multiple access (HSDPA/WCDMA) transceiver, or a global system for mobile communications (GSM) transceiver.

Accordingly, the application processor 212 may process a signal output from the modem 213, and transmit the processed signal to the display device 215. Further, the modem 213 may convert a signal transmitted from the application processor 212 into the radio signal, and output the converted radio signal to an external device through the antenna 214.

Further, the application processor 212 includes an image processing device 10. In this example embodiment, the image processing device 10 may be the image processing device 10 shown in FIG. 5.

Figure 12:
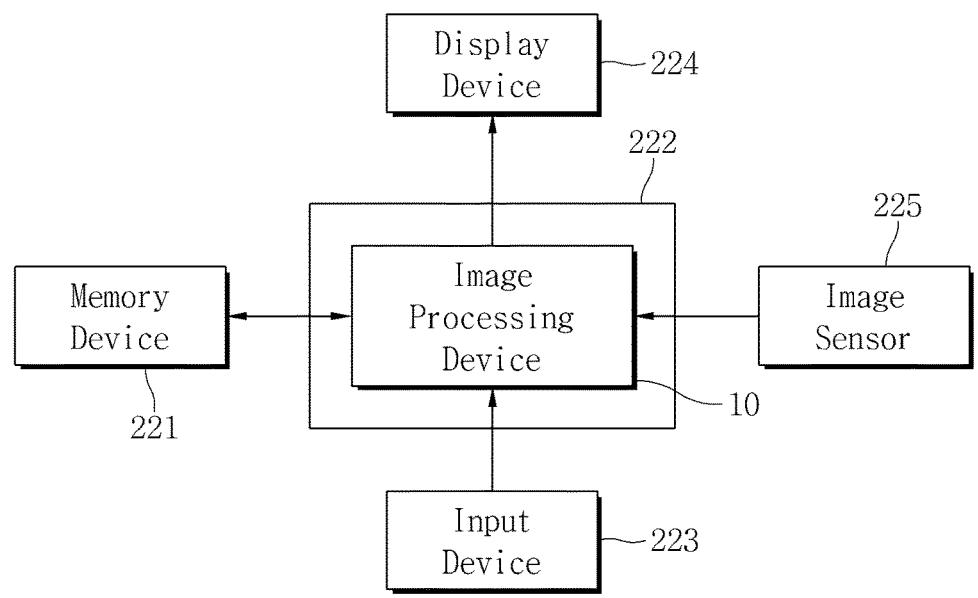
FIG. 12 is a block diagram of another example embodiment of a mobile device including the image processing device shown in FIG. 5.

FIG. 12 is a block diagram of another example embodiment of a mobile device including the image processing device shown in FIG. 5.

Referring to FIG. 12, the mobile device 220 may be embodied as an image process device, such as a digital camera or a mobile phone having a digital camera, a smart phone, a tablet PC, etc.

The mobile device 220 includes a memory device 221, an application processor 222 including a memory controller for controlling a data processing operation of the memory device 221, an input device 223, and a display device 224.

The input device 223 is a device for inputting a control signal for controlling an operation of the application processor 222 or data to be processed by the application processor 222, and may be implemented as a pointing device, such as a touch screen, touch pad, computer mouse, a keypad, or a keyboard.

The application processor 222 displays data stored in the memory device 221 through the display device 224. The application processor 222 may control overall operations of the mobile device 220.

Further, the application processor 222 includes an image processing device 10. In this example embodiment, the image processing device 10 may be the image processing device 10 shown in FIG. 5.

Figure 13:
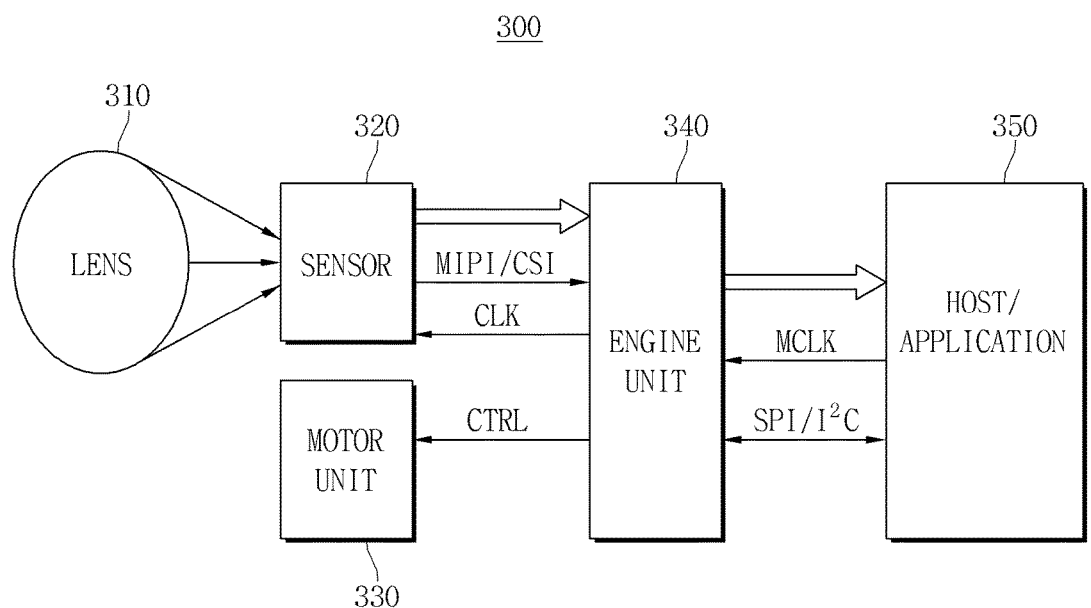
FIG. 13 is a block diagram illustrating a camera system according to an example embodiment of inventive concepts.

FIG. 13 is a block diagram illustrating a camera system according to an example embodiment of inventive concepts.

Referring to FIG. 13, the camera system 300 may include a lens 310, an image sensor 320, a motor unit 330, an engine unit 340, and a host/application unit 350. The image sensor 320 may include the image processing device 10 shown in FIG. 5.

In this example embodiment, the camera system 300 may include a digital camera device.

The lens 310 collects incident light to an integration region (e.g., a photodiode) of the image sensor 320.

The image sensor 320 generates image data based on the incident light through the lens 310. The image sensor 320 may provide the image data based on a clock signal CLK. In this example embodiment, the image sensor 320 may interface with the engine unit 340 through a mobile industry processor interface (MIPI) and/or a camera serial interface (CSI).

The motor unit 330 may control a focus of the lens 310 in response to a received control signal CTRL from the engine unit 340, or perform shuttering.

The engine unit 340 controls the image sensor 320 and the motor unit 330. Further, the engine unit 340 may generate YUV data including a distance from a subject, a luminance component, a difference between the luminance component and a blue component, and a difference between the luminance component and a red component based on a distance received from the image sensor 320 and image data, or generate compression data (e.g., joint photography experts group (JPEG) data).

The engine unit 340 may be connected to the host/application unit 350. And the engine unit 340 provides YUV data or JPEG data to the host/application unit 350 based on a master clock MCLK. Further, the engine unit 340 may interface with the host/application unit 350 through a serial peripheral interface (SPI) and/or an inter-integrated circuit (I2C).

In this example embodiment, the engine unit 340 may include the image processing device 10 shown in FIG. 5.

Figure 14:
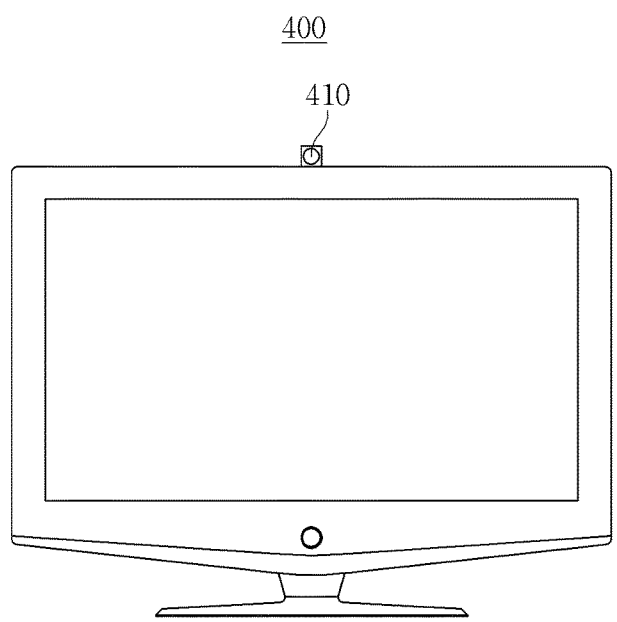
FIG. 14 is an example embodiment of a display device including the image sensor module shown in FIG. 10.

FIG. 14 is an example embodiment of a display device including the image sensor module shown in FIG. 10.

Referring to FIG. 14, a display device 400 may be embodied in a display device installed in a smart TV, a monitor, or various mobile devices.

The display device 400 may include a camera device 410. When the display device 400 is the smart TV, various applications may be installed in the display device 400.

For example, a user may perform a video call application using the camera device 410 installed in the display device 400.

In this example embodiment, the camera device 410 may include the image sensor module 100 shown in FIG. 10.

Image processing devices according to one or more example embodiments of inventive concepts may remove color fringe. Accordingly, the image processing device may correct color distortion.

Further, image processing devices according to one or more example embodiments of inventive concepts may not need color fringe detection process. Accordingly, the image processing device may be implemented with simpler hardware.

Inventive concepts may be applied to application processors including image processing devices. Further, inventive concepts may be applied to mobile devices and/or wearable devices including the application processors.

While inventive concepts have been described with reference to example embodiments, it will be understood by those skilled in the art that various changes and modifications may be made without departing from the spirit and scope of inventive concepts as defined by the appended claims.

Although a few example embodiments have been described, those skilled in the art will readily appreciate that many modifications are possible without materially departing from the novel teachings and advantages of inventive concepts. Accordingly, all such modifications are intended to be included within the scope of inventive concepts as defined in the claims.

What is claimed is:

1. An image sensor module comprising:
    an image sensor; and
    an image processing device configured to receive an input image including a green channel, a red channel, and a blue channel from the image sensor, the image processing device including
        a guided image filtering circuit configured to correct chromatic aberration in the input image by applying a guided filter to the red channel and the blue channel to generate a corrected red channel and a corrected blue channel, the guided filter based on the green channel, and
        an image summation circuit configured to generate a chromatic aberration corrected output image by summing the green channel, the corrected red channel, and the corrected blue channel,
    wherein the guided image filtering circuit is configured to utilize one of the green channel, the red channel and the blue channel as a guidance image.

2. The image sensor module of claim 1, wherein the guided image filtering circuit is further configured to utilize the green channel as the guidance image.

3. The image sensor module of claim 1, wherein the guided image filtering circuit is further configured to apply the guided filter with respect to all pixels in the input image.

4. The image sensor module of claim 1, wherein the guided image filtering circuit is further configured to utilize each of the red channel and the blue channel as filtering input.

5. The image sensor module of claim 1, wherein the image processing device does not perform color fringe detection with respect to the input image.

6. The image sensor module of claim 1, wherein the guided image filtering circuit is further configured to filter the red channel and the blue channel based on the green channel in an edge area of the input image.

7. The image sensor module of claim 1, wherein the guided image filtering circuit does not filter the red channel, the green channel, and the blue channel in a non-edge area of the input image.

8. The image sensor module of claim 1, wherein the image processing device is further configured to remove color fringe from the input image such that the chromatic aberration corrected output image does not include the color fringe.

9. An image sensor module comprising:
    an image sensor; and
    an image processing device configured to
        correct chromatic aberration in an input image by applying a guided image filter to a red channel and a blue channel of the input image, the input image including a green channel, the red channel and the blue channel, the guided image filter being based on the green channel, and
        generate a chromatic aberration corrected image by summing the filtered red channel, the filtered blue channel, and the green channel, and
        output the chromatic aberration corrected image.

10. The image sensor module of claim 9, wherein the image processing device is further configured to utilize the green channel as a guidance image to correct chromatic aberration in the input image.

11. The image sensor module of claim 9, wherein the image processing device is further configured to generate the chromatic aberration corrected image without performing chromatic aberration detection on the input image.

12. The image sensor module of claim 11, wherein the image processing device is further configured to apply the guided image filter with respect to all pixels in the input image.

13. The image sensor module of claim 9, wherein the image processing device is further configured to
    apply the guided image filter to the red channel and the blue channel in an edge area of the input image, and
    not apply the guided image filter to the red channel, the green channel, and the blue channel in a non-edge area of the input image.

* * * * *